D. C. SLAGHT.
MOTOR VEHICLE.
APPLICATION FILED MAY 29, 1915.
1,223,629.
Patented Apr. 24, 1917.
4 SHEETS—SHEET 1.
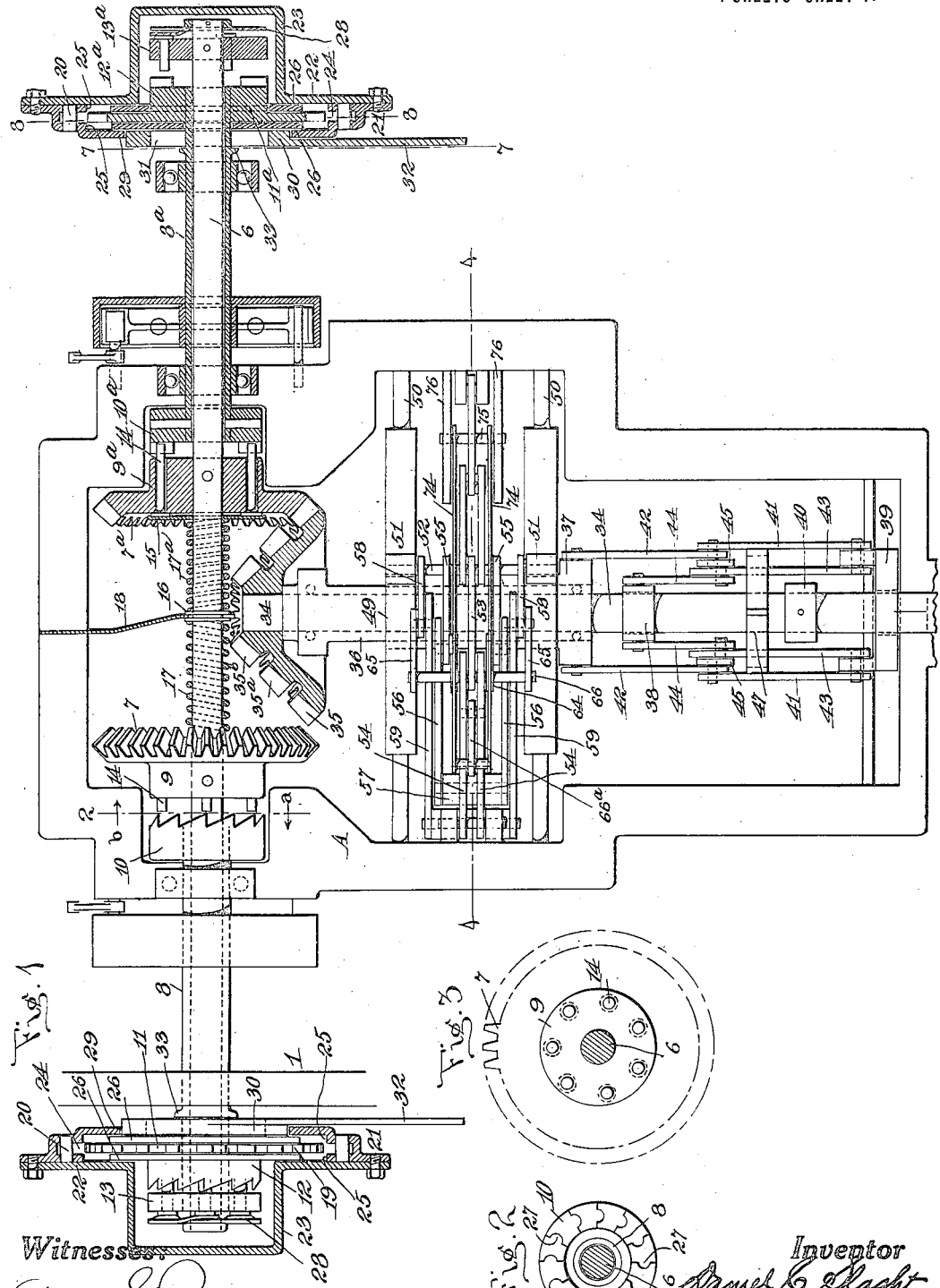

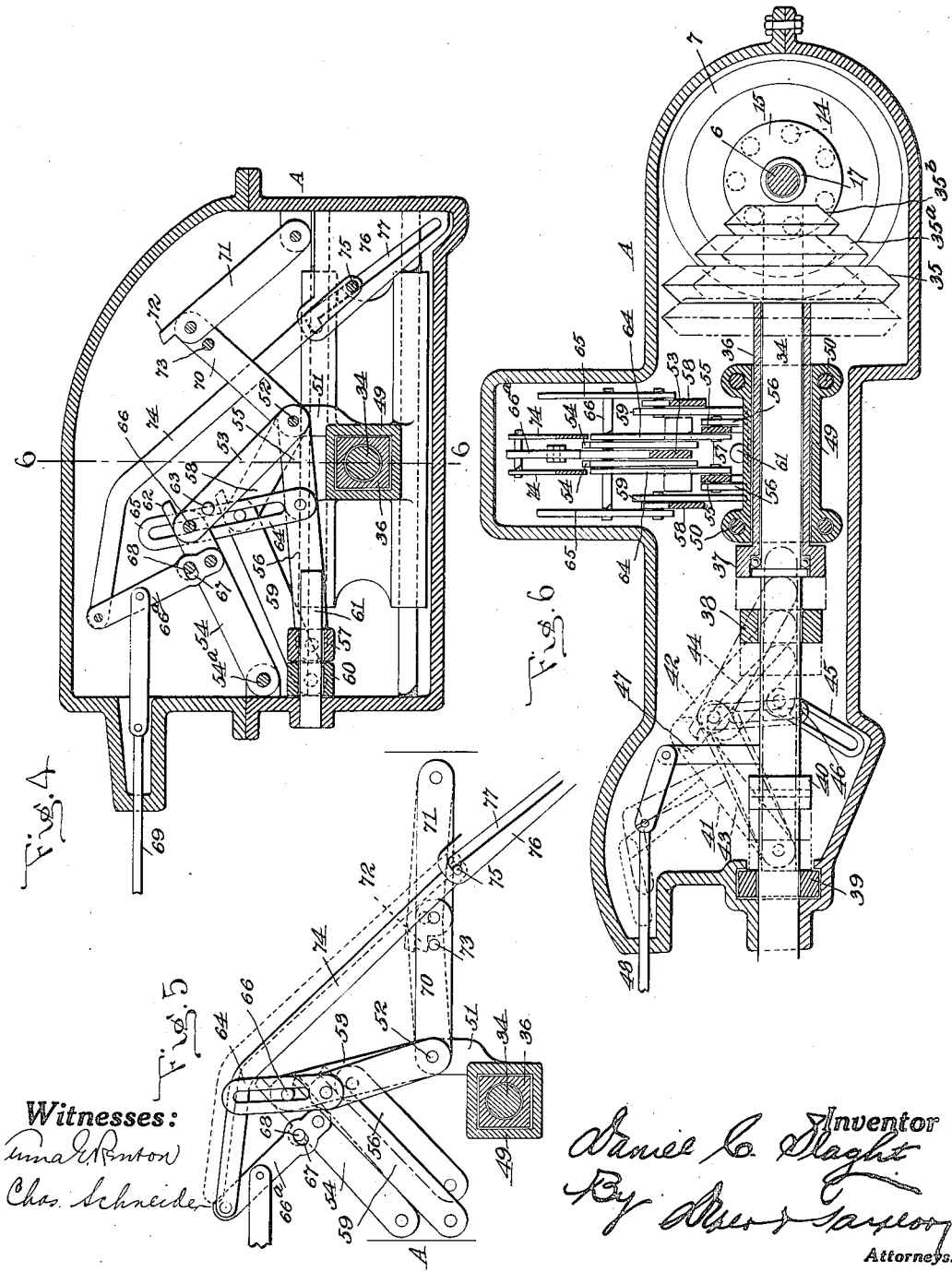

D. C. SLAGHT.
MOTOR VEHICLE.
APPLICATION FILED MAY 29, 1915.
1,223,629.
Patented Apr. 24, 1917.
4 SHEETS—SHEET 3.
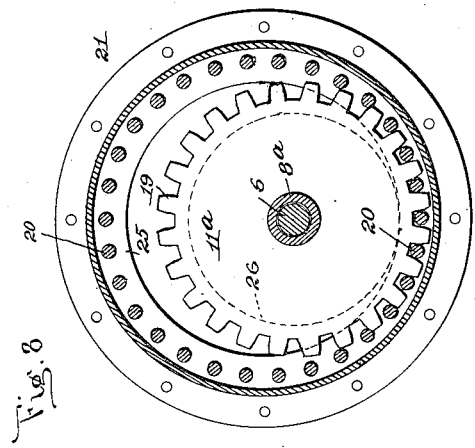
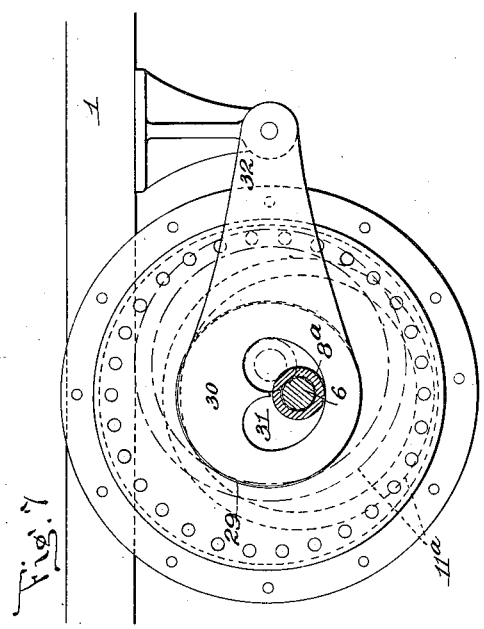
Witnesses:
Inventor

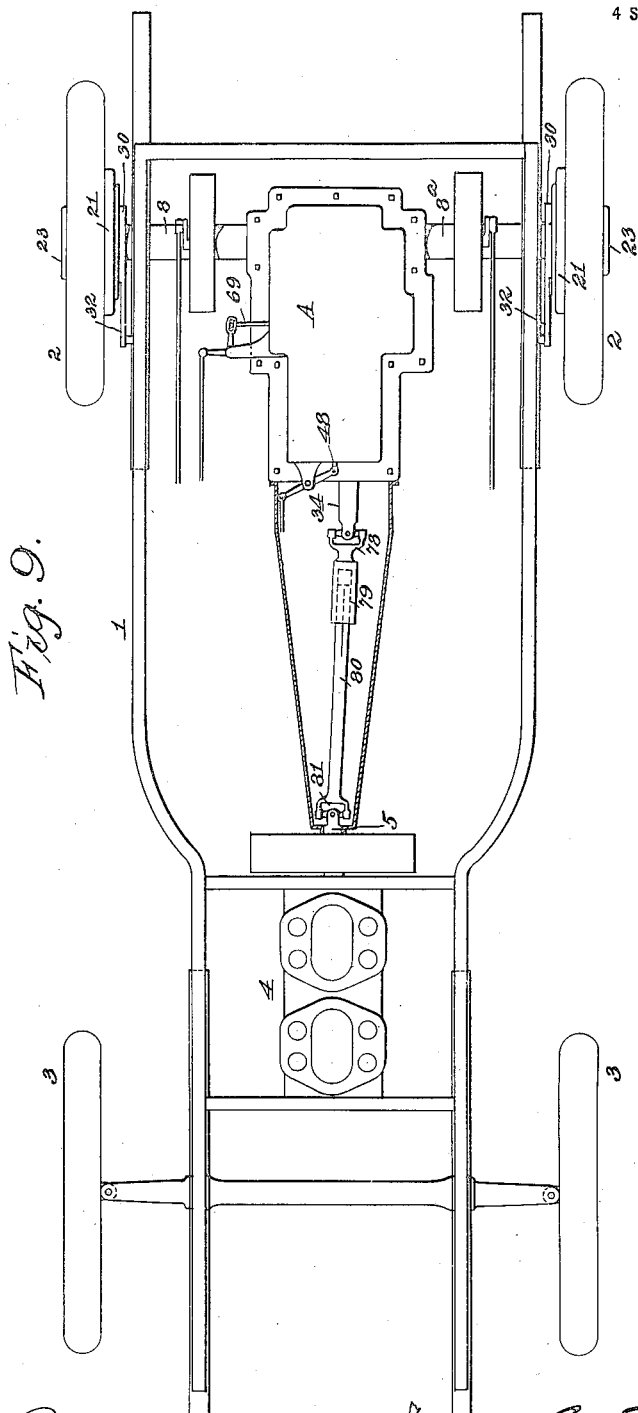

UNITED STATES PATENT OFFICE.

DANIEL C. SLAGHT, OF EASTON, PENNSYLVANIA.

MOTOR-VEHICLE.

1,223,629.   Specification of Letters Patent.   Patented Apr. 24, 1917.

Application filed May 29, 1915. Serial No. 31,148.

*To all whom it may concern:*

Be it known that I, DANIEL C. SLAGHT, a citizen of the United States, residing at Easton, county of Northampton, and State of Pennsylvania, have invented a new and useful Improvement in Motor-Vehicles, of which the following is a specification.

My invention relates to motor vehicles and more particularly to the driving and change speed mechanisms and the wheels therefor and has for its object to provide means whereby the wheel on one side of the driving axle may be caused to travel at a different rate of speed from that of the wheel on the other side when making a turn, without the use of a differential.

A further object is to produce a device in which the brake drum may be located inside the chassis frame thus permitting the wheels to be set nearer the frame.

A further object is to produce a simple and effective form of speed transmission wherein a minimum number of gears is employed and wherein changes in speed and in direction of travel may be accomplished with expedition and certainty.

A further object is to so proportion and arrange the transmission gears that when they are moved into engagement one with another the engagement is simultaneously across the faces of the gears and not by a sliding engagement as at present.

A further object is to produce a simple form of wheel in which in starting the weight of the vehicle will assist in the starting and when the brake is applied the weight of the vehicle will assist in arresting the movement of the vehicle.

These and further objects will more fully appear in the following specification and accompanying drawings, considered together or separately.

I have illustrated my improvement in the accompanying drawings in which:

Figure 1 is a plan view partly in section of the driving axle and speed changing devices, the parts being in position for driving at high speed ahead;

Fig. 2 is a detail sectional view taken on the line 2—2 of Fig. 1 looking in the direction of the arrow $a$;

Fig. 3 is a detail sectional view taken on the line 2—2 looking in the direction of the arrow $b$;

Fig. 4 is a transverse section taken on the line 4—4 of Fig. 1;

Fig. 5 is a diagrammatic view taken on the same line as is Fig. 4 but with the parts in position to reverse;

Fig. 6 is a longitudinal section taken on the line 6—6 of Fig. 4;

Fig. 7 is a detail sectional view taken on the line 7—7 of Fig. 1;

Fig. 8 is a similar view taken on the line 8—8 of Fig. 1; and

Fig. 9 is a diagrammatic plan view of the chassis of a motor vehicle embodying my invention.

In all the above views like parts in all of the several figures are designated by similar reference characters.

In the drawings 1 designates the frame of a motor vehicle having drive wheels 2, steering wheels 3, and a motor 4 having a crank shaft 5. The motor is carried in the frame near that end thereof farthest removed from the drive wheels 2. The driving axle is of the live type and consists of a shaft 6 extending entirely across the frame and projecting beyond the sides thereof. The shaft 6 has secured thereto at its central portion and spaced apart a pair of bevel gears 7 and $7^a$. Carried on the shaft at one side of the center and outside of the gear 7 is a sleeve 8 and on the outside of the gear $7^a$ is a similar sleeve $8^a$. Supported on the sleeves by means of suitable gearings is a casing A which incloses the gears and gear shifting devices to be hereinafter described. The sleeves 8 and $8^a$ are held in the frame against longitudinal movement and the shaft is capable of rotative and longitudinal movement relatively to the sleeves. The gear 7 is provided with a clutch member 9 and the gear $7^a$ has a similar member $9^a$. The clutch members 9 and $9^a$ are adapted to be brought into engagement with members 10 and $10^a$ on the sleeves 8 and $8^a$ respectively. 11 and $11^a$ designate disks carried respectively at the outer ends of the sleeves 8 and $8^a$ and the disks are provided with clutch members 12 and $12^a$ respectively.

Rigidly secured to one end of the shaft 6 is a clutch member 13 and a similar member $13^a$ is secured to the opposite end. The members 13 and $13^a$ are adapted to engage the members 12 and $12^a$ respectively.

The clutch members 10, $10^a$, 12 and $12^a$ are of ratchet tooth jaw construction and allow the members engaging them to freely move in one direction when the members are in engagement one with the other. The members 9 and 9ª consist of pins 14 which project through the hubs of the gears 7 and 7ª. The pins are each provided with a head at its inner end and the heads in each member are engaged by a disk 15 loosely mounted on the shaft 6. The center of the shaft is provided with a grooved collar 16 and between the collar and each disk 15 is a spiral spring 17, 17ª respectively. The springs 17 and 17ª tend normally to hold the pins 14 in position projecting from the face of the hubs of the gears 7 and 7ª.

Engaging with the grooved collar 16 and anchored in the casing A is a leaf spring 18 which tends to return the shaft to its central, normal position after it has been moved longitudinally in the sleeves 8 and 8ª.

The peripheries of the disks 11 and 11ª are provided with gear teeth 19 which mesh with teeth 20 in a cap 21. The cap is closed by a cover 22 and the cover is provided with a casing 23 which incloses the clutch members 12, 13 and 12ª, 13ª. To the casing 23 the spokes of the wheels 2, 2 are secured in any approved manner. The cap 21 is provided with an interior circular chamber 24 and the teeth 20 are in the form of bars which extend across said chamber. In the embodiment illustrated the teeth are shown as cylindrical bars but it will be understood that they may be of any approved form. The interior of the cap forms circular shoulders 25, 25, and loosely mounted at each side of the disks 11 and 11ª is a circular disk 26. The disks 26 bear on the shoulders 25 and form anti-friction bearings for the wheels 2. The radial face of each jaw of the clutch members 10, 10ª, 12 and 12ª is provided with a semi-cylindrical socket 27 for the reception of the pins forming the other clutch member of its set. The pins of the clutch members 13 and 13ª are forced toward the members 12 and 12ª respectively by spring washers 28 on the ends of the shaft 6.

The wheel described above operates in the same manner and for the same purpose as the traction wheel described in the application for patent of D. C. Slaght and W. T. Miller, filed June 27, 1912, Serial No. 706,135, and in my Patent Number 965,030 dated July 19, 1910.

In all of the clutch members 10, 10ª, 13 and 13ª the number of pins employed does not correspond with the number of teeth in its engaging member, nor is the number of pins a multiple of the number of teeth. By this construction when the clutch members are engaged only one pin will be seated in a recess in the opposing member and, as the number of pins differs from the number of teeth the relative rotative movement of the clutch members before a pin falls into engagement with a recess, will be shorter than the space between the teeth.

The inner side of each cap 21 has a circular recess 29 and loosely mounted within the recess is a disk 30. The disks are each provided with a curved slot 31 surrounding the sleeves 8 and 8ª respectively for a purpose to be hereinafter described. Each disk is provided with an arm 32 which is pivoted to the frame 1 to act as a radius rod and hold the shaft in position relatively to the frame. A disk 30 is held in position on the axle between the innermost disk 26 on each end of the axle and a flange 33 on the sleeves 8 and 8ª.

A shaft 34 extends longitudinally of the casing A and carries at its rear end a cone of bevel pinions 35, 35ª and 35ᵇ. The pinions are located between the bevel gears 7 and 7ª, are of different diameters and are so mounted that any one of them may be engaged with one of the gears (for example 7ª) to drive the gear and the axle shaft 6 at different rates of speed. The smallest of the pinions is adapted to engage the other gear (for example 7) and drive it and the axle shaft in the reverse direction at the slowest speed.

The apparatus for shifting the shaft 34 and the pinions 35, 35ª and 35ᵇ longitudinally of the vehicle to bring them successively into alinement with the gear 7ª is as follows:

The shaft 34 is mounted in anti-friction bearings in a tubular casing 36 and is free to rotate therein, but is held against longitudinal movement relatively to said casing. At one end the casing is provided with a cross head 37 and slidably carried on the shaft adjacent to the cross head 37 is a collar 38. Slidably mounted in guides in the end of the casing A is a slide 39 through which the shaft passes and rigidly secured to the shaft 34 adjacent to the slide is a collar 40. Pivoted to the slide 39 and at each side of the shaft 31 is a link 41 which is secured at its free end to a similar link 42. The other end of each link 42 is pivoted to opposite sides of the cross head 37. A second pair of links 43 is pivoted, one on each side of the shaft, to the slide and these links are secured to links 44 which are pivoted to the collar 38. Carried on the pivot at the junction of each pair of links 41—42, is a slotted leaf 45 and the slot of the leaf engages with a pin 46 carried on each link 43. An arm 47 projects from the links 41—41 and is attached to an operating rod 48 which extends through the casing A to a point within reach of the driver.

The links 41, 42, 43 and 44 are prevented from passing below the horizontal or dead center position and when in this position, as shown in Figs. 1 and 6, the casing 36 and with it the shaft 34 will be moved to the extreme rearward positions, and held against forward movement by reason of the fact that the links are on their dead centers, and the pinion 35 will be in position to be moved into engagement with the gear 7ª. By moving the rod 48 to the left, in Fig. 6, the joined ends of the links 41 and 42 will be raised and, as the links 41 are anchored to the slide 39, the casing 36 and shaft 34 will be drawn to the left until the cross head 37 comes into contact with the collar 38 when the movement will be arrested for the reason that the links 43 and 44 are in the horizontal position and will act as a stop. During the movement of the links 41 and 42 just described the slot in the leaf 45 will move along the pin 46 and when the cross head 37 engages the collar 38 the pin will be at the bottom of the slot. The pinion 35ª is now in position to engage the gear 7ª.

Further movement of the rod 48 to the left will raise the joined ends of the links 41 and 42 and the end of the slot in the leaf 45 will raise the pin 46, break the joint of the links 43—44, raise such links with the links 41 and 42 by the engagement of the cross head 37 with the collar 38, move the collar 38 and the casing 36 with the shaft 34 to the left until the collar 40 comes into contact with the slide 39. The movement will be arrested and the pinion 35ᵇ will be in position to engage the gear 7ª to drive the axle shaft forward at its lowest speed or to engage the gear 7 to drive the axle shaft backward.

On reversing the movement of the rod 48 the links will be returned to their horizontal positions and the pinions will be moved back to the position shown in Figs. 1 and 6.

The devices for moving the pinions into and out of engagement with the gears 7 and 7ª will now be described.

The casing 36 is made non-circular in cross section and is slidably carried in a carriage 49 which moves transversely of the apparatus and within the casing A. The carriage is mounted on rods 50 which extend across the casing A from side to side. The carriage is provided at one side with a pair of ears 51 which support a rod or shaft 52. Pivoted to the center of the rod 52 is a toggle arm 53 the free end of which is pivoted to a pair of similar arms 54—54. The arms 54 are pivoted at 54ª to lugs carried on the inside of a wall of the casing A. Pivoted to the rod 52 is a pair of toggle arms 55 joined to a pair of similar arms 56 whose outer ends are pivoted to a sleeve 57. The pivot rod 52 also supports the ends of a pair of arms 58 to which a pair of arms 59 is secured and the arms 59 are pivoted to a sleeve 60 similar to the sleeve 57. The sleeves 57 and 60 are mounted to slide on a rod 61 carried by the casing A. The ends of the arms 54, 56 and 59 are provided with fingers 62 which engage with stops 63 on their companion arms 53, 55 and 58 respectively when the arms are in their horizontal or dead center positions and prevent them from dropping below the horizontal.

Carried on the pivot at the junction of the arms 55 and 56 is a slotted link 64 and a similar link 65 is carried on the pivot at the joint of the arms 58 and 59 and the pivot 66 of the arms 53 and 54 is elongated and engages the slots in the links 64 and 65.

Pivotally connected to the arms 54 is a lever 66ª which is provided with a slot 67 working over a pin 68 to provide for a certain amount of lost motion. The free end of the lever 66 is connected by means of a link with an operating rod 69 by means of which the parts just described may be operated.

Pivoted on the rod 52 is a pair of toggle arms 70 which extend in the direction opposite to that of the before described toggle arm and these arms are pivoted to an arm 71 which in turn is pivoted to a lug on the casing A. The arm 71 carries a finger 72 which engages a stop 73 on the arms 70 when the arms are in the horizontal position. Pivoted to the outer end of the lever 66 is a pair of legs 74 whose other ends are connected together by a pin 75 which lies under arm 71. Carried on the casing A and disposed at each side of the arm 71 is a bracket 76. The brackets are provided with slots 77 which guide the pin 75 in its travel. The upper ends of the slots are off set so that when the lever 66 is in its extreme position to the left, as shown in Fig. 5, the pin will rest in the off sets and the arm 71 will be in its horizontal or dead center position and resting on the pin.

The shaft 34 is connected to the crank shaft 5 in the following manner:

At the forward end of the shaft 34 is a universal joint 78 one member of which is provided with an elongated non-circular socket 79 and engaging in the socket is the non-circular end of a shaft section 80. The latter shaft is connected to the crank shaft 5 by a universal joint 81. The front of the casing A is slotted to allow for the horizontal movement of the shaft 34 and the joints 78 and 81 allow for the changes in the angle of the shaft section 80 and the socket 79 allows for changes in the distance between the shafts 5 and 34. The universal joints and the shaft section 80 are inclosed in a boot 82 which extends from the casing A to the fly-wheel of the motor 4.

The operation is as follows:

Let it be assumed that the speed desired is high speed ahead and the operating rod 48 has been moved to the position shown in full lines in Fig. 6, as before described, the shaft 34 is in its central position and moved rearwardly to its extreme position, the pinion 35 is in line with the teeth of the gears 7 and $7^a$, and the links 41—42 and 43—44 are in their horizontal or dead center positions thereby locking the shaft against movement toward the front. The joints of the toggle arms 53—54, 55—56, 58—59 and 70—71 will be broken by the movement of the rod 69 to its extreme position to the left in Fig. 6 and the arms will be raised from the horizontal, the spring 18 having moved the shaft 6 to its central position, the clutch members 9—10, $9^a$—$10^a$, 12—13 and $12^a$—$13^a$ will be out of engagement and the vehicle will be at rest with the shaft 34 revolving and the pinion 35 midway between the gears 7 and $7^a$. The collar 60 rests against the casing A and the collar 57 rests against the collar 60. The rod 69 is now moved to the right in Fig. 4, this movement will depress the toggle arms and move the casing 49, and with it the shaft 34, to the right. The pinion 35 will be brought into engagement with the gear $7^a$ and the gear and its shaft 6 will be moved to the right. One of the pins 14 will engage in a socket 27, the sleeve $8^a$ will be rotated and with it the disk $11^a$. The teeth of the disk being in engagement with the teeth 20 in the hub 22 at the right in Fig. 1 will drive that wheel forward. The movement of the shaft 6 to the right will engage one of the pins of the clutch member 13 with the members 12 and the teeth of the disk 11 will engage the teeth 20 in the hub of the left hand wheel and drive it forward. The toggle arms 55 and 56 are now in such a position that the three pivotal points of the arms are in line and the shaft 34 is firmly held against movement to the left in Fig. 1.

When it is desired to drive the vehicle at the second speed forward, the rod 48 is moved to the left in Fig. 6, the joint of the links 41—42 will be broken and the cross head 37, and with it the shaft 34 and pinions 35, $35^a$ and $35^b$, will be moved to the left until the cross head engages the collar 38. The pinion 35 will be disengaged from the gear $7^a$ and the pinion $35^a$ will be in position to engage such gear.

The further movement of the rod 69 to the right will depress the arms 58—59 still further until the arms 58—59 are at the dead center with their middle pivot in line with the pivot 52 and the pivot in the sleeve 60, the shaft 34 will be moved to the right to engage the pinion $35^a$ with the gear $7^a$ and the shaft 6 will be driven at second speed forward.

When low speed forward is required the rod 48 is moved still further to the left, the links 43—44 will be raised and the shaft 34 will be moved to the right until its movement is arrested by the engagement of the collar 40 with the slide 39. The pinion $35^b$ is now in line with the gear $7^a$ and the further movement of the rod 69 to the right will depress the arms 53 and 54 and move the carriage 49 and with it the shaft 34 and pinion $35^b$ to the right until the pinion engages the gear and drives the shaft 6 forward at low speed.

When it is desired to reverse the direction of travel of the vehicle and the rod 48 is in the position last described, the rod 69 is moved to the left. The joint of the arms 53—54 will be broken and they will be raised thereby drawing the carriage 49 to the left and disengaging the pinion $35^b$ from the gear $7^a$. The continued movement of the rod will cause the pivot 66 to engage the upper end of the slots in the links 64 and break the joint of the arms 58—59 and raise them to move the carriage 49 the second step to the left. Further movement of the rod will cause the pivot 66 to engage the ends of the slots in the links 65, break the joints in the arms 53—54 and move the carriage another step to the left, engage the pinion $35^b$ with the gear 7 and the shaft 6 will be driven in the reverse direction. When the gears are in reverse the arms 70 and 71 will be in their horizontal positions and the carriage will be firmly held in position with the pinion $35^b$ in engagement with the gear 7 and the pin 75 will be seated in the off sets of the slots 77 and resting against the arm 71.

The gearing will be taken out of reverse by a reversal of the above described operation and the first movement of the rod 69 to the right will cause the lever $66^a$ to move relatively to the pin 68. This will move the legs 74 and cause the pin 75 to raise in the off set and break the joint in the arms 70—71. The continued movement of the rod 69 will tend to straighten out the toggles until the pinion $35^b$ is free from the gear 7 and the shaft 34 will be in neutral position.

On making a turn the drive wheel on the inner side of the curve will drive the vehicle and, by reason of the ratchet teeth arrangement of the clutch members 12 and $12^b$ the wheel traveling on the outer curve will be permitted to run at a higher speed than the driver to compensate for the greater distance to be traversed.

The driving wheel is one in which the axle floats eccentrically in the hub of the wheel forward or backward, according to whether the vehicle is being driven forward or backward, or is being driven or checked, and the axle applies its power or braking effect to the wheel through gearing which is primarily to lift the weight of the vehicle and over-balance the wheel in one or the other direction as described in the patent and application before mentioned.

When the axle starts to rotate the toothed disks 11 and $11^a$ will climb up on the teeth 20 of the hub proper and the weight of the vehicle will be raised and moved forward or back as the case may be and this weight will assist the engine in starting the car. The axle will be limited in its climbing movement by the slot 31 in the disk 30. The weight of the vehicle will be taken up by the disks 26 and shoulders and not on the teeth 19 and 20. As the disks and shoulders will have a rolling contact wear will be reduced to a minimum. The wheel hub will be cheap of construction as the number of finished surfaces is small, the teeth 20 are of simple form and perform no function except that of transmitting power.

The brake shown is of the ordinary internal expansion type and the drums are carried on the sleeves 8 and 8ª. The expanding members are carried on a stationary part of the vehicle such for instance the casing A.

When the brake is applied and the rotation of the sleeves 7 and 7ª arrested, the teeth of the disks will engage the teeth 20 to retard the movement of the wheels and the momentum of the car will carry the wheels in the direction of travel of the car and the toothed disks will climb up on the teeth 20 but on that side of the axle opposite to the direction of travel and the weight of the vehicle will be added to the braking effect.

I have shown my improvement in connection with a vehicle having three speeds forward and one reverse, but it will be understood that any number of speeds may be employed by changing the number of steps in the pinion on the motor shaft and increasing or diminishing the number of units in the casing A.

It will be understood that when the driving axle is in operation both wheels are being positively driven and while one wheel may travel faster than another when taking a curve, one wheel cannot stand still while the other spins around as in axles having a differential. With my improved apparatus both wheels pull alike at all times even should one of them be running in sand or on a slippery part of the road.

Should one driving wheel break down the vehicle may be driven by its own power through the uninjured wheel by the simple expedient of putting a runner under the disabled wheel.

With my improved type of wheel wear on the tire caused by slipping will be reduced to a minimum for the reason that the weight of the car is carried ahead of the resistance. On a grade or when starting there is no turning force imparted to the wheel until the weight of the car is raised and moved in the direction of travel.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention what I claim as new and desire to secure by Letters Patent is as follows:

1. In a motor vehicle the combination with a motor, a driving axle and means for driving the axle, of wheels carried on the axle, means for driving a wheel independently of the axle and means for driving a wheel from the axle.

2. In a motor vehicle the combination with a motor, a driving axle shaft, a sleeve on the shaft, wheels supported on the shaft, connections between the motor and the shaft for driving the shaft, means for driving the sleeve, and connections whereby one wheel is driven by the shaft and connections whereby one wheel is driven by the sleeve.

3. In a motor vehicle the combination with a motor, a driving axle shaft; sleeves on the shaft, wheels carried on the sleeves, and connections between the motor and shaft for driving the latter, of means for driving a wheel, means carried by the sleeve for driving a wheel, and means carried by the shaft for driving a wheel.

4. In a motor vehicle the combination with a motor, a driving axle shaft, sleeves on the shaft, wheels loosely carried on the sleeves, and connections between the motor and shaft for driving the latter, of means for driving a sleeve, means carried by the sleeve for driving a wheel and means carried by the shaft for driving a wheel.

5. In a motor vehicle the combination with a motor, a driving axle shaft, sleeves on the shaft, wheels loosely carried on the sleeves, and connections between the motor and shaft for driving the latter, of means carried by the shaft for driving a sleeve, means carried by the sleeve for driving a wheel and means carried by the shaft for driving a wheel.

6. In a motor vehicle the combination with a motor, a driving axle shaft, sleeves on the shaft, wheels loosely carried on the sleeves, and connections between the motor and shaft for driving the latter, of detachable means for driving a sleeve, means carried by the sleeve for driving a wheel and means carried by the shaft for driving a wheel.

7. In a motor vehicle the combination with a motor, a driving axle shaft, sleeves on the shaft, wheels loosely carried on the sleeves, and connections between the motor and shaft for driving the latter, of detachable means carried by the shaft for driving a sleeve, means carried by the sleeve for driving a wheel and means carried by the shaft for driving a wheel.

8. In a motor vehicle the combination with a motor, a driving axle shaft, sleeves on the shaft, wheels carried on the sleeves, connections between the motor and shaft for driving the latter, and means for varying the speed of the shaft relatively to that of the motor, of means for driving a sleeve, means carried by the sleeve for driving a wheel and means carried on the shaft for driving a wheel.

9. In a motor vehicle the combination with a motor, a driving axle shaft, sleeves on the shaft, wheels carried on the sleeves, connections between the motor and shaft for driving the latter, means for varying the speed of the shaft relatively to that of the motor, and means for changing the direction of rotation of the shaft, of means for driving a sleeve, means carried by the sleeve for driving a wheel and means carried on the shaft for driving a wheel.

10. In a motor vehicle the combination with a motor, a driving axle shaft, sleeves on the shaft, and connections between the motor and the shaft for driving the latter, of wheels, connections between each sleeve and a wheel, and means for connecting the shaft to the sleeve.

11. In a motor vehicle the combination with a motor, a driving axle shaft, a gear on the axle shaft, a pinion on the motor shaft, means for engaging the pinion with a gear, a sleeve carried on the axle shaft in proximity to the gear and means for locking the sleeve to the shaft, of a wheel and connections between the sleeve and wheel for driving the latter, said connections permitting relative movement of the sleeve and wheel.

12. In a motor vehicle the combination with a motor, a driving axle shaft, a gear on the axle shaft, a pinion on the motor shaft, means for engaging the pinion with a gear, and a sleeve carried on the axle shaft in proximity to the gear, of a clutch member on the gear, a clutch member on the sleeve, means for engaging the pinion with the gear, means for engaging the clutch members, a wheel, and connections between the sleeve and wheel for driving the latter, said connections permitting relative movement of the sleeve and wheel.

13. In a motor vehicle the combination with a motor, a driving axle shaft, a plurality of gears on the axle shaft, a pinion on the motor shaft, means for engaging the pinion with a gear, and a sleeve carried on the axle shaft in proximity to each gear, of a clutch member on each gear, a clutch member on each sleeve, means for engaging the pinion with a gear, means for engaging the clutch members, a wheel, and connections between the sleeve and wheel for driving the latter, said connections permitting relative movement of the sleeve and wheel.

14. In a motor vehicle the combination with a motor, a driving axle shaft, a pinion on the motor shaft, a gear on the axle shaft, a sleeve on the shaft in proximity to the gear, a clutch member on the gear, a clutch member on the sleeve, and means for moving the pinion to engage the gear and couple the shaft to the sleeve, of a wheel, a clutch member on the wheel, a clutch member on the shaft and means for engaging the last mentioned clutches to couple the wheel to the shaft.

15. In a motor vehicle the combination with a motor, a driving axle shaft, a pinion on the motor shaft, a gear on the axle shaft, a sleeve on the shaft in proximity to the gear, a ratchet clutch member on the gear, a ratchet clutch member on the sleeve, and means for moving the pinion to engage the gear and couple the shaft to the sleeve, of a wheel, a ratchet clutch member on the wheel, a ratchet clutch member on the shaft and means for engaging the last mentioned ratchet clutches to couple the wheel to the shaft.

16. In a motor vehicle the combination with a motor, a driving axle shaft, a cone pinion on the motor shaft, a pair of gears secured to the axle shaft, and situated one on either side of the pinion, a sleeve on the shaft in proximity to each gear, a clutch member on each sleeve, and spring pressed pins carried by the gears for engagement with the clutch members to lock the sleeves to the shaft, of a wheel carried on each sleeve, a clutch member on each wheel, and spring pressed pins on the ends of the axle shaft to engage the last mentioned clutch members to lock the wheels to the shaft.

17. In a motor vehicle the combination with a motor, a driving axle shaft, a cone pinion on the motor shaft, a pair of gears secured to the axle shaft and situated one on either side of the pinion, a sleeve on the shaft in proximity to each gear, a ratchet clutch member on each sleeve, and spring pressed pins carried by the gears for engagement with the clutch members to lock the sleeves to the shaft, of a wheel carried on each sleeve, a ratchet clutch member on each wheel, and spring pressed pins on the ends of the axle shaft to engage the last mentioned clutch members to lock the wheels to the shaft.

18. In a motor vehicle the combination with a motor, a motor shaft, and a pinion on the shaft, of a driving axle shaft, a gear on the shaft, a sleeve on the axle shaft, a clutch member on the sleeve, a clutch member on the gear, means for moving the pinion to engage the sleeve, and means for moving the pinion away from the sleeve.

19. In a motor vehicle the combination with a motor, a flexible motor shaft, and a pinion on the shaft, of a driving axle shaft, a gear rigidly secured to the shaft, a sleeve loosely carried on the shaft, a clutch member on the sleeve, a clutch member on the gear, and means for moving the pinion to engage the gear and to move the shaft to engage the clutch members.

20. In a motor vehicle the combination with a motor, a motor shaft, and a pinion on the shaft, of a driving axle shaft, a gear on the shaft, a sleeve on the axle shaft, a ratchet clutch member on the sleeve, a ratchet clutch member on the gear, means for moving the pinion to engage the sleeve, and means for moving the pinion away from the sleeve.

21. In a motor vehicle the combination with a motor, a flexible motor shaft, and a pinion on the shaft, of a driving axle shaft, a gear rigidly secured to the shaft, a sleeve loosely carried on the shaft, a ratchet clutch member on the sleeve, a ratchet clutch member on the gear, and means for moving the pinion to engage the gear and to move the shaft to engage the clutch members.

22. In a motor vehicle the combination with a motor, a flexible, extensible motor shaft, and a cone pinion on the shaft, of a driving axle shaft, a gear on the axle shaft at each side of the cone, means for moving the motor shaft to bring a desired step of the cone in position to engage a gear, a sleeve on the axle shaft in proximity to each gear, and means for moving the pinion into engagement with a gear and for locking the gear to a sleeve.

23. In a motor vehicle the combination with a motor, a driving axle shaft, sleeves on the shaft, connections between the motor and the shaft for driving the latter, and connections between a sleeve and the shaft for driving the sleeve, of a wheel, a gear carried by the wheel and a gear carried by the sleeve for rotating the wheel.

This specification signed and witnessed this sixth day of February, 1915.

DANIEL C. SLAGHT.

Witnesses:
FRANK FLYNN,
CHAS. B. BRUNNER.